United States Patent
Arnegger

(10) Patent No.: US 6,176,213 B1
(45) Date of Patent: Jan. 23, 2001

(54) ADMISSION SYSTEM FOR AN INTERNAL COMBUSTION ENGINE

(75) Inventor: Klaus Arnegger, Ludwigsburg (DE)

(73) Assignee: Filterwerk Mann & Hummel GmbH, Ludwigsburg (DE)

(*) Notice: Under 35 U.S.C. 154(b), the term of this patent shall be extended for 0 days.

(21) Appl. No.: 09/155,765

(22) PCT Filed: Feb. 6, 1997

(86) PCT No.: PCT/EP97/00536
§ 371 Date: Mar. 2, 1999
§ 102(e) Date: Mar. 2, 1999

(87) PCT Pub. No.: WO97/38221
PCT Pub. Date: Oct. 16, 1997

(30) Foreign Application Priority Data

Apr. 4, 1996 (DE) ............................. 196 13 467

(51) Int. Cl.[7] ................................. F02M 35/104
(52) U.S. Cl. ..................... 123/184.61; 123/184.55
(58) Field of Search ............... 123/184.21, 184.38, 123/184.47, 184.48, 184.49, 184.53, 184.55, 184.61; 285/285.1, 295.3, 49, 294.3, 296.1

(56) References Cited

U.S. PATENT DOCUMENTS

| | | | |
|---|---|---|---|
| 4,543,918 | * 10/1985 | Ma | 123/184.42 |
| 4,829,944 | * 5/1989 | Sukimoto et al. | 123/184.61 |
| 4,887,557 | * 12/1989 | Sukimoto et al. | 29/890.08 |
| 4,901,681 | * 2/1990 | Pozniak et al. | 123/184.31 |
| 4,932,369 | * 6/1990 | Parr | 123/184.42 |
| 5,243,933 | * 9/1993 | Mukawa | 123/184.61 |
| 5,253,616 | * 10/1993 | Voss | 123/184.47 |
| 5,560,330 | * 10/1996 | Andress et al. | 123/184.53 |
| 5,630,387 | * 5/1997 | Kamiyama | 123/184.38 |
| 5,851,456 | * 12/1998 | Mukawa et al. | 264/40.1 |
| 5,957,504 | * 9/1999 | Cwik | 285/49 |
| 5,971,439 | * 10/1999 | Cwik | 285/49 |
| 5,992,369 | * 11/1999 | Mehne | 123/184.21 |

FOREIGN PATENT DOCUMENTS

| | | |
|---|---|---|
| 3536522 | 4/1987 | (DE) . |
| 3742057 | 9/1988 | (DE) . |
| 8914049 | 2/1990 | (DE) . |
| 4404946 | 8/1995 | (DE) . |
| 98543 | 1/1984 | (EP) . |
| 432919 | 6/1991 | (EP) . |
| 464 860 | 1/1992 | (EP) . |
| 2017118 | 5/1970 | (FR) . |
| WO 9300505 | 1/1993 | (WO) . |
| WO 9323666 | 11/1993 | (WO) . |

OTHER PUBLICATIONS

"Luftfuehrungselmente aus Kunststoff" *MTZ Motortechnische Zeitschrift* vol. 54, No. 12, p. 652 (Dec. 1, 1993).

* cited by examiner

Primary Examiner—Andrew M. Dolinar
Assistant Examiner—Hai Huynh
(74) Attorney, Agent, or Firm—Evenson, McKeown, Edwards & Lenahan, P.L.L.C.

(57) ABSTRACT

The invention relates to an admission system for an internal combustion engine, in particular for a motor vehicle engine. Said admission system has a connecting flange (11) for fastening the system to the internal combustion engine, a collection unit (12) which has at least one connection for supplying the intake air, and suction pipe connections the number of which depends on the number of suction pipes. Connection is achieved by suction pipes produced by a plastic blowing process.

9 Claims, 2 Drawing Sheets

ADMISSION SYSTEM FOR AN INTERNAL COMBUSTION ENGINE

BACKGROUND OF THE INVENTION

The invention relates to an intake system for an internal combustion engine, especially for a motor vehicle engine according to the preamble of the main claim.

German OS 41 10 597 discloses an intake system for a multicylinder internal combustion engine which is configured as an intake system. In such an air intake system a plurality of intake tubes is required, which feed the cleaned aspirated air from a manifold passage to the individual aspirating ports in the cylinder head of the engine. The intake system consists usually of aluminum or synthetic resin material and is made by casting or injection molding.

A disadvantage of such systems consists in the complicated manufacturing process. For example, it is known to manufacture an intake system by the core melting process, wherein a metal core, which forms the later cavities of the system, is encased in synthetic resin material and this metal core is then melted out. It is also possible to make such an air intake system of synthetic resin material by the multiple shell technique, that is, to form individual synthetic resin shells and weld them together.

The invention is addressed to the problem of avoiding the described disadvantages and of creating an intake system which is simple to manufacture and involves no great expense in assembly. This problem is solved by the characteristics of the main claim.

The core idea of the invention is to make the very irregularly shaped air intake tubes, which considerably complicate the manufacturing process, of one or more blow-molded parts and fasten these parts with flange elements or additional synthetic resin components which have a simple structure. In fastening the blow-molded part with a connecting flange and other elements it is possible to make the junction non-transmissive of vibration. This means that, between the two elements to be joined, an elastomeric composition is installed by an assembly injection molding process. This elastomeric composition produces on the one hand a reliable junction between the two elements. On the other hand it decouples this element with regard to the transmission of vibrations.

An additional advantage in the use of blow-molded parts is that the vibration tube lengths can be made variable, that is, optimization is possible without great effort.

A preferred embodiment of the invention provides for making the elements not made by the blow-molding of synthetic resin material by the injection molding method out of thermoplastic synthetic resin material.

According to an embodiment of the invention, furthermore, an additional connection to one or more suction pipes is provided, making this connection for coupling to or uncoupling from a switching means. With the additional connection the possibility is offered of providing the intake system with an additional duct which can be opened and closed depending on the speed of the motor and its load.

In order to produce a highly precise synthetic resin component, the possibility exists of making it from glass fiber reinforced thermoplastic synthetic resin, the glass fibers being so-called long fibers. These long fibers have the advantage that they embed themselves anisotropically in the synthetic resin material and thus the tensional performance of the synthetic resin material is isotropic. Preferably, polypropylene or polyamide can be used as synthetic resin material. As a result of the simple production of the collecting unit, additional elements can be integrated therein, such as throttle valve, air volume meters and other necessary components.

These and other features of preferred embodiments of the invention will appear not only from the claims but also from the description and the drawings, the individual features being able to be embodied individually or plurally in the form of sub-combinations in the embodiment of the invention and in other fields, and can be advantageous as well as independently patentable embodiments for which protection is hereby claimed.

Embodiments of the invention are represented in the drawings and are further explained hereinbelow.

The drawings show:

DETAILED DESCRIPTION OF PREFERRED EMBODIMENTS

Figure 1:
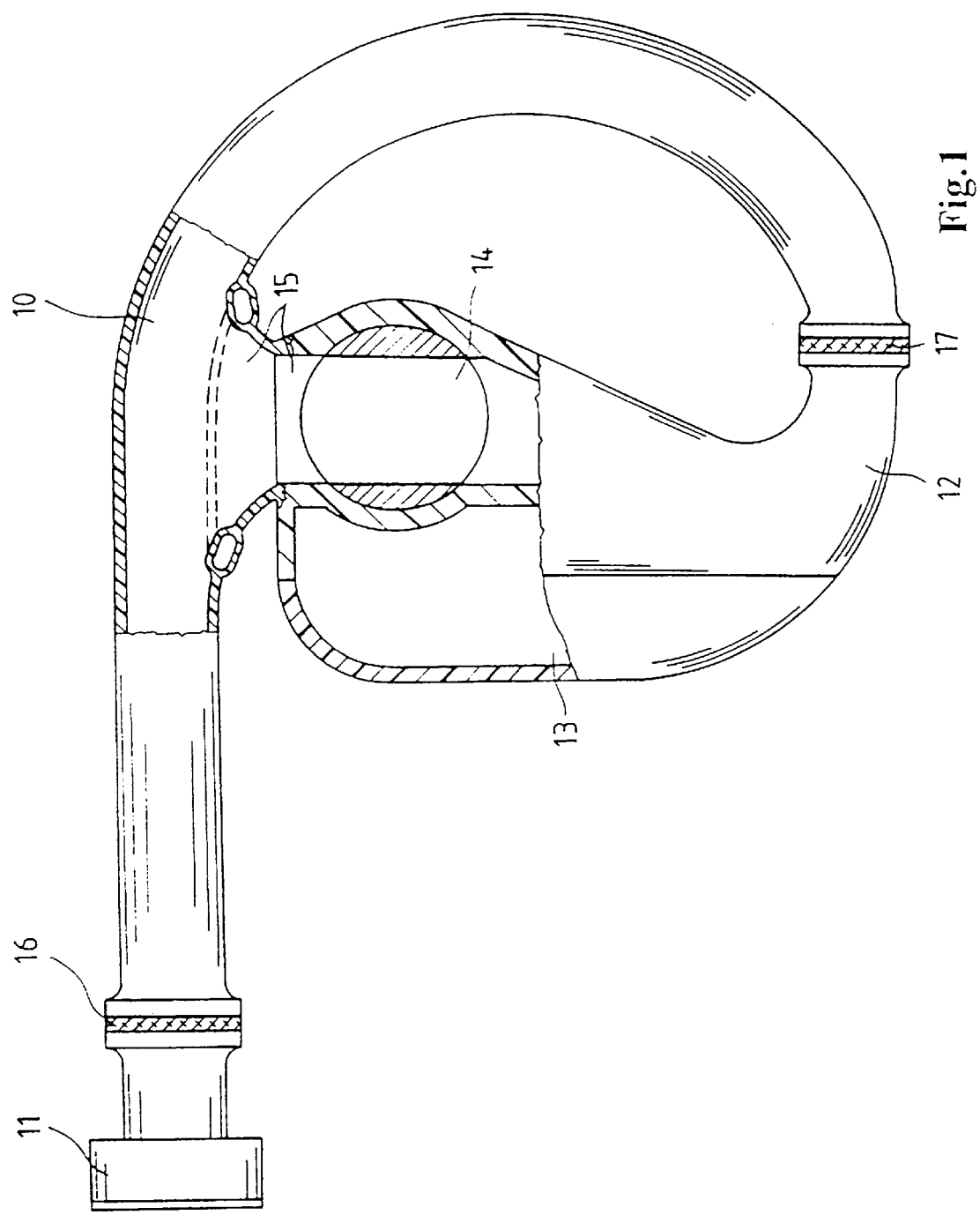
FIG. 1 a cross section of an intake system represented schematically.

FIG. 1 shows an intake system comprising a suction pipe 10, a flange 11, a collecting unit 12 with a cover 13. In the collecting unit is a switching cylinder 14 which in the position shown here connects an opening 15 to the collecting unit 12. The suction pipe is joined at the junction 16 to the flange 11 and at junction 17 to the collecting unit 12. While the entire intake system is fastened by flange 11 to the cylinder head of an internal combustion engine, not shown, this system is supported on the opposite side on a support or fastening element not shown here.

Figure 2:
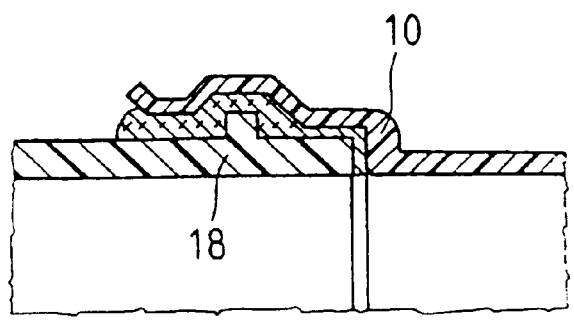
FIG. 2 a detail of a connection between the synthetic resin blower part and a connecting flange, FIG. 3 a plan view of an intake system.

Junction 16 as well as junction 17 are represented in a detail view in FIG. 2. The suction pipe 10 made of synthetic resin material overlaps a flange element 18, with a slight gap between these two elements. After the two parts are put together this gap is filled with an elastomer, TPE for example, by a so-called assembly injection-molding process. This elastomer produces a positive, mating junction between the two parts. Moreover, the elastomer is appropriate for the effective damping of vibrations that are introduced into the intake system through the flange element 18. Also the opening 15 between the collecting unit 12 and the suction pipe 10 can be formed from an elastomeric material. Thus the transmission of vibration of one component to the other is prevented.

Figure 3:
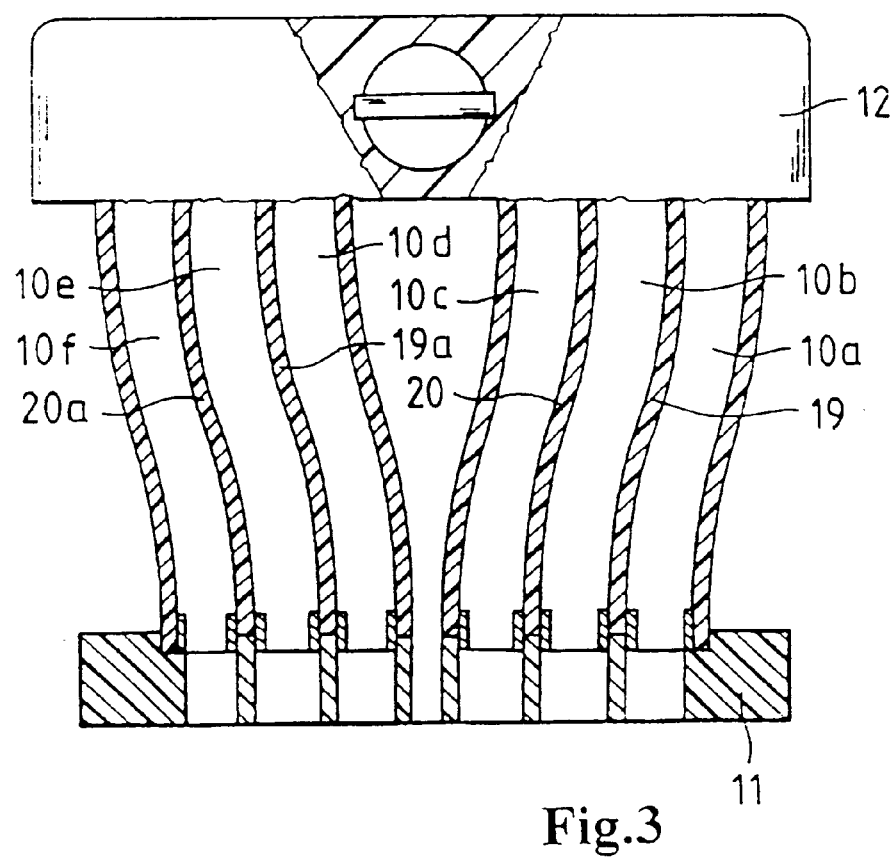

FIG. 3 shows an intake system in a plan view. The individual suction pipes 10a to 10f are comprised in groups of three. One group of three is blown from a single tube. This tube is squeezed between the suction pipes to form them so that two pinch seams 19, 20 and 19a, 20a are created. The two groups of tubes can be joined in a single working operation both to the flange 11 and to the collecting unit 12. A throttle valve, here represented schematically, is integrated in the collecting unit to control the rate of air flow. Of course, additional elements such as valves, oil separators or the like can be connected in or to the collecting unit.

What is claimed is:

1. An intake system for an infernal combustion engine of a motor vehicle, said intake system being a plastic component comprising:

a flange for fastening the intake system to the internal combustion engine;

a collecting unit which has at least one connector for supplying intake air and a plurality of connectors for suction pipes; and a plurality of suction pipes each connecting said flange with a respective connector of said collecting unit;

wherein said suction pipes are blow-molded plastic tubes, and wherein the connection of each suction pipe to the flange or to the respective connector of the collecting unit is effected through an elastomer introduced by assembly injection molding between an end of the suction pipe and the respective part to which the end of the suction pipe is connected.

2. An intake system according to claim 1, wherein at least one of the connection of each suction pipe to the fastening flange and the connection of each suction pipe to the respective connector of the collecting unit is decoupled against transmission of vibration.

3. An intake system according to claim 2, wherein said fastening flange and said collecting unit are injection molded parts of thermoplastic synthetic resin material.

4. An intake system according to claim 2, wherein a second connection is provided between the collecting unit and each suction pipe, and each second connection is provided with a shut-off device for selectively opening or closing said second connection.

5. An intake system according to claim 4, wherein said second connection is connected to a supplemental suction pipe.

6. An intake system according to claim 2, wherein said collecting unit is formed of glass fiber reinforced thermoplastic synthetic resin material which contains long fibers.

7. An intake system according to claim 2, wherein said collecting unit further comprises a throttle valve for regulating the flow of air therethrough.

8. An intake system according to claim 2, wherein said collecting unit further comprises an air volume meter for measuring an amount of air flowing therethrough.

9. An intake system according to claim 2, wherein said collecting unit is constructed from a plurality of identical structure modules.

* * * * *